United States Patent [19]
DeBoskey et al.

[11] Patent Number: 6,073,161
[45] Date of Patent: Jun. 6, 2000

[54] METHOD AND APPARATUS FOR DETERMINING EDITING CONFLICTS IN A MULTI-AUTHORING SYSTEM

[75] Inventors: David DeBoskey, Campbell; Grace Francisco; Darryl Jon Mocek, both of San Jose; Jenny Yukkoo Nishimura, Campbell, all of Calif.

[73] Assignee: International Business Machines Corporation, Armonk, N.Y.

[21] Appl. No.: 08/991,319

[22] Filed: Dec. 16, 1997

[51] Int. Cl.[7] .................................................. G06F 15/16
[52] U.S. Cl. ........................... 709/200; 709/201; 709/205; 709/220; 709/224; 709/242; 709/246; 707/201; 707/203; 707/530; 707/540
[58] Field of Search ..................................... 709/200–206, 709/213–215, 220–224, 227–228, 246, 238, 242; 707/8–10, 103–104, 201–203, 530, 540

[56] References Cited

U.S. PATENT DOCUMENTS

| 5,481,735 | 1/1996 | Mortensen et al. | 709/246 |
| 5,710,922 | 1/1998 | Alley et al. | 707/201 |
| 5,732,219 | 3/1998 | Blumer et al. | 709/22 |
| 5,787,247 | 7/1998 | Norin et al. | 709/220 |
| 5,787,262 | 7/1998 | Shakib et al. | 709/205 |
| 5,835,601 | 11/1998 | Shimbo et al. | 707/203 |
| 5,987,497 | 11/1999 | Allgeier | 709/201 |

*Primary Examiner*—Ahmad F. Matar
*Assistant Examiner*—Bharat Barot
*Attorney, Agent, or Firm*—Kudirka & Jobse, LLP

[57] ABSTRACT

Disclosed is a system for resolving multi-authoring conflicts that result when multiple users at client computers on a network computer system read and write to the same network file comprised of a plurality of objects. A first client computer downloads a network file from a network drive and creates and edits a client version of the network file on the first client computer. A second client computer downloads the same network file from the network drive. To determine whether there is a conflict between modifications made by the second client computer to the network file and editing to objects in the client version by the first client computer, a determination is made as to whether the network file was modified by the second client computer while the first client computer was editing the client version. If so, then a determination is made as to whether there is a conflict between the editing by the first client computer to the object in the client version and the modification to the network file by the second client computer. A user at the first client computer may have the option of overwriting the conflicting object in the network file with the object edited by the first user or saving the edited object under a different name.

32 Claims, 8 Drawing Sheets

6,073,161

METHOD AND APPARATUS FOR DETERMINING EDITING CONFLICTS IN A MULTI-AUTHORING SYSTEM

BACKGROUND OF THE INVENTION

1. Field of the Invention

The present invention relates to a method for editing and saving files in a network computer system and, in preferred embodiments, for handling multi-authoring conflicts resulting from multiple users concurrently editing and saving to the same file on a network drive.

2. Description of the Related Art

In a network computer system, multiple client computers are linked to a server via a network. Users at client computers in the network can read and write to files stored on a network drive in the server, such as spreadsheet, database, and word processing files. Users may download a file from the network drive to their respective client computer and edit such file. Two users may concurrently download and edit the same file on the network drive at their separate client computers. A multi-authoring conflict may arise when one of the users saves the file to the network drive while other users are still editing the file. In such case, those users editing the file after another user has saved the file will be editing a file that is different from the file they initially downloaded from the network drive.

To address such multi-authoring conflicts, prior art programs may cause the client computers to lock the file on the current users so they cannot make any changes to the file on the network drive after another user has saved to the file on the network drive. Other programs address the problem by not permitting multiple users to work on the same file. In such systems, when a second user attempts to pull up a file from the network drive which is being edited by another user, the program may present a dialog box informing the second user that the program may be pulled up in read-only mode. In read-only mode, the second user must save the file under a different name. In yet other programs, the last user editing the file may save the edited file but only after overwriting any changes made to the version of the file on the network drive. These prior art programming techniques do not permit multiple users from simultaneously editing and saving to the same file even if the users are editing separate unrelated sections of the same file.

SUMMARY OF THE INVENTION

To address the shortcomings in the prior art, preferred embodiments of the present invention disclose a system for editing and saving a network file including a plurality of objects on a network drive. A first and second client computers are linked to the network drive over a network. A network file may be downloaded from the network drive to the first client computer, wherein a client version of the network file is created and edited by the first client computer. The second client computer may download the network file from the network drive. To determine whether there is a conflict between modifications made by the second client computer to the network file and editing to an object in the client version by the first client computer, a first determination is made as to whether the network file was modified by the second client computer while the first client computer was editing the client version. If so, then a determination is made as to whether there is a conflict between the editing to the object in the client version by the first client computer and the modification to the network file by the second client computer.

In further embodiments, upon determining that there is a conflict, a dialog box is displayed providing information on the conflict between the editing of the object by the first client computer and the modifications to the network file by the second client computer.

In yet further embodiments, the network file maintains information on a revision time for the network file modified by the second client computer and for each object within the modified network file. Further, the client version maintains a revision time for the network file and for each object in the network file at the time the first user downloaded the network file from the network drive. This revision time information is first used in the step of determining whether the network file was modified by the second client computer while the first client computer was editing the client version. A determination is made as to whether the revision time for the network file maintained in the client version is earlier than the revision time for the network file maintained in the network file. If the network file was modified while the first client computer was editing the client version, then revision time information is used to determine whether there is a conflict at the object level by comparing the revision time for an object maintained in the client version and the revision time for the object in the network file. If the revision time for the object maintained in the client version is earlier than the revision time for the object in the network file, then the second client computer has modified the object in the network file while the first client computer was editing the object in the client version. In alternative embodiments, the network file and client version of the network file may be comprised of multiple associated files.

It is an object of preferred embodiments of the present invention to provide an improved system for determining whether there is a conflict between a client version of a network file being worked on by a first client computer and any changes to the network file by a second client computer.

It is a further object that a revision time for objects within the network file as modified by the second client computer be maintained in the network file on the network drive and that a revision time for objects in the network file at the time the first user downloaded the network file to the first computer be maintained in the client version on the first client computer.

It is yet a further object that this object revision time information be used to determine if the object in the network file has been modified while the first client computer was editing the object in the client version.

It is still a further object of preferred embodiments that objects in the client version be incrementally saved to the network file such that the saving of the object to the network file does not effect other objects maintained in the network file.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
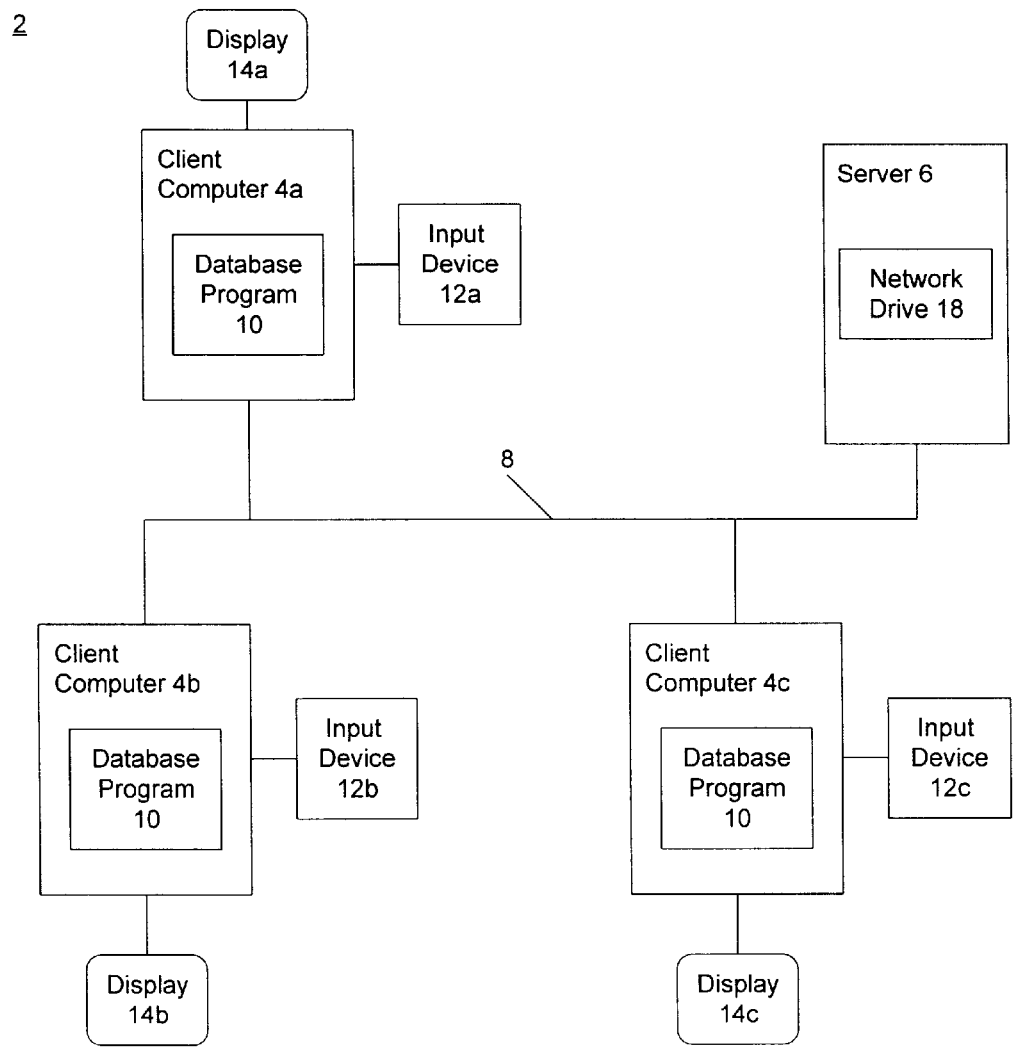
FIG. 1 is an exemplary hardware and software environment used to implement preferred embodiments of the present invention.

FIG. 1 shows a preferred embodiment of a network computer system 2 adapted to incorporate preferred embodiments of the present invention. The network computer system 2 comprises a plurality of client computers 4a, b, c that are connected to a server 6 via a network 8 (e.g., Token-ring, LAN, Ethernet, WAN, TCP/IP, etc.).

In the preferred embodiment, the client computers 4a–c comprise personal computers that execute under the control of an operating system, such as the WINDOWS operating system. However, those skilled in the art will recognize that the client computers 4a–c could comprise any type of computer such as a laptop, palmtop, workstation, mainframe, etc., and the operating system could comprise any operating system, such as OS/2, OS/390, MVS, VM, AIX, MACINTOSH, UNIX, etc. In preferred embodiments, a database program 10 is installed on each client computer 4a–c, such as the database program Lotus Approach™, manufactured by Lotus Development Corporation, a wholly owned subsidiary of International Business Machines Corporation, the assignee of the present patent application. Attached to each client computer 4a–c is an input device 12a–c (e.g., keyboard, mouse pointing device, voice activated input device, touch sensitive display, etc.) and a monitor 14a–c (e.g., CRT, LCD, etc.). Each client computer 4a–c would include a data communication device (e.g. modem, network interface, etc.) to interface with the network 8. A user at a client computer 4a, b, c has read and write access to files on a network drive 18 in the server 6 through the network 8.

The client computer 4a–c usually operates under the control of an operating system. Preferred embodiments are implemented by one or more computer programs, referred to herein as the database program 10, that operate under the control of the operating system. Generally, the database program 10 is embodied in or readable from a computer-readable medium or carrier. Under control of an operating system, the database program 8 may be loaded from a data storage device and/or a remote device into a memory of the client computer 4a–c. The database program 10 comprises instructions which, when read and executed by the client computer 4a–c, cause the computer 4a–c to perform the steps necessary to execute the steps or elements of preferred embodiments of the present invention.

In preferred embodiments, the database program 10 configures the client computers 4a–c to allow the user to create and edit a database file comprised of many different objects, such as form objects, view objects, calculated fields, database fields, etc. A form object is a file, such as an HTML file, that displays the information in the database in specified formats. A form object can be used to generate a summary report, a worksheet, a data entry form, etc. Each form object is comprised of subcomponent view objects which define how the form object will display information from the database file. Other objects would include the fields within the database. A field is a data category within the database which defines the database structure.

A database file which includes the database records, form objects and other objects is typically named with a particular extension, such as APR. The user may create a plurality of objects associated with the database file. In preferred embodiments, these related objects are stored as subcomponents of the main database file (.APR).

Figure 2:
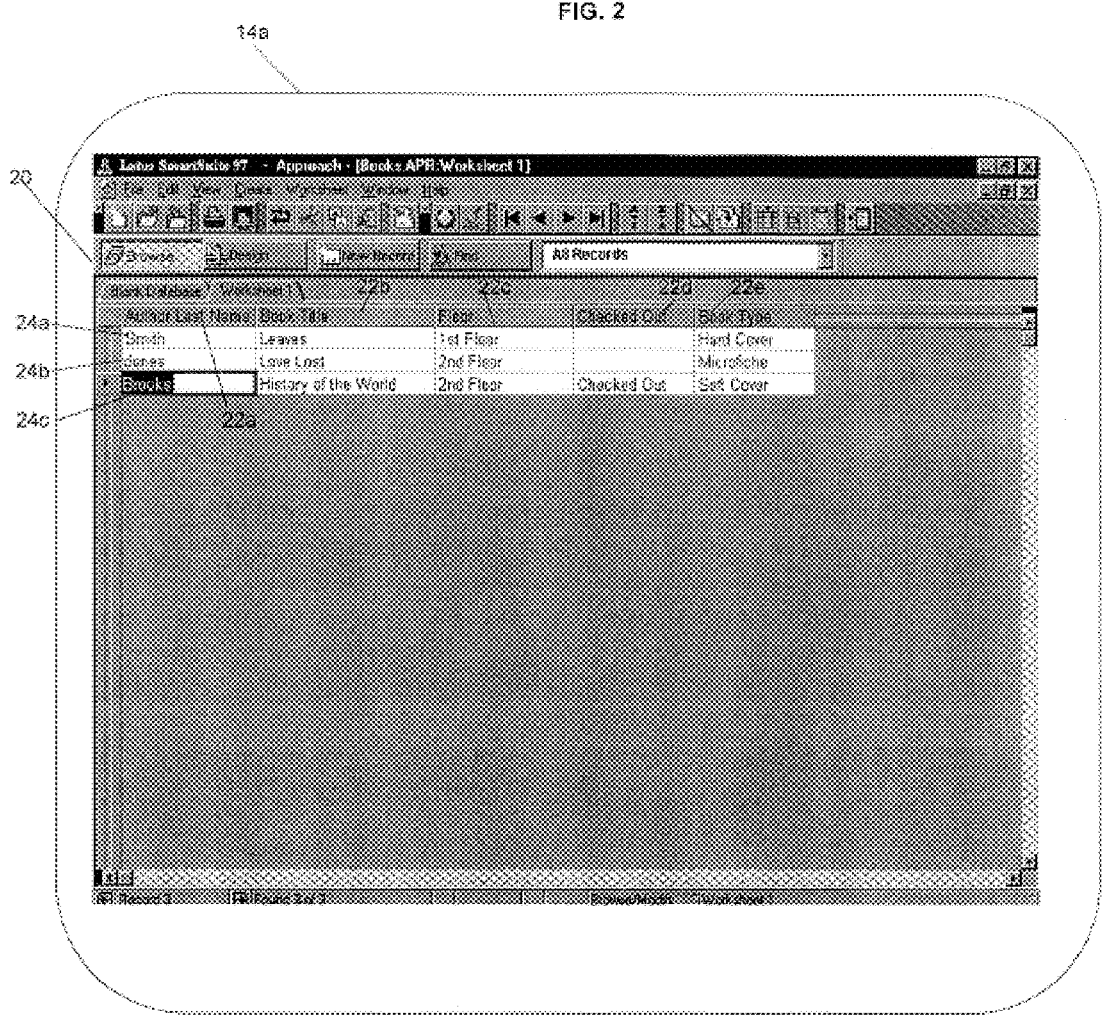
FIG. 2 is a "snapshot" of a window displaying the data records included in the database file and the data fields thereof.

FIG. 2 is an illustration of a worksheet 20 displayed in the display 14a of client computer 4a. This worksheet 20 is a form object which is a component of the database file named "books.apr." The database file "books.apr" includes five data fields that maintain information on books stored in a library. The worksheet 20 shows these five data fields: an author last name field 22a, a book title field 22b, a floor field 22c identifying the floor where the book is shelved, a checked out field 22d indicating whether the book is checked out, and a book type field 22e indicating whether the book is hardcover, softcover or on microfiche. The worksheet 20 lists three data records 24a, 24b, 24c included in the database file "books.apr."

Figure 3:
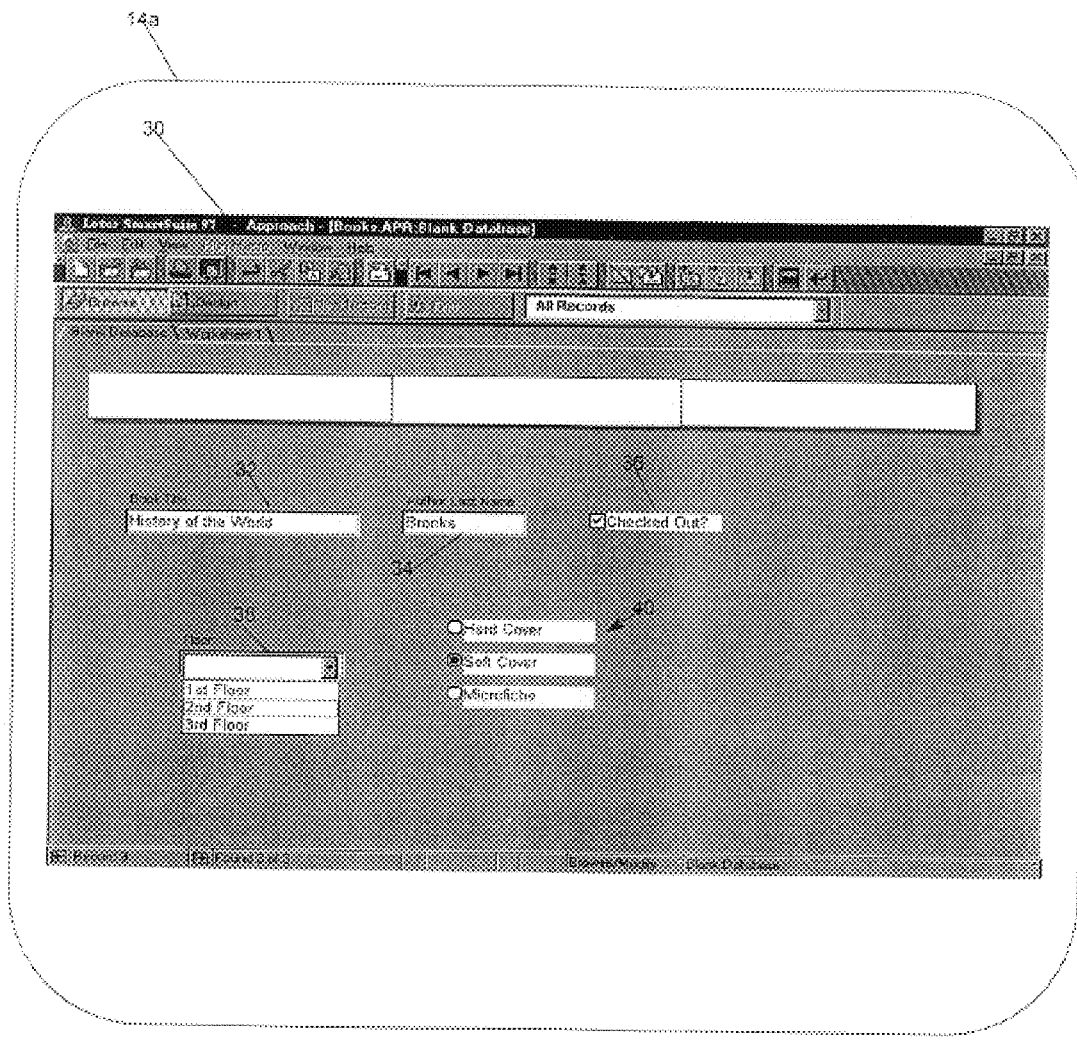
FIG. 3 is a "snapshot" of a window displaying a form included in the database file used to enter data records into the database file.

FIG. 3 illustrates a data entry form 30 displayed on the monitor 14a, which is used for entering data into the database. The data entry form 30 is another form object associated with and stored in the database file "books.apr." The user enters a data record 24a–c into the database file by using the input device 12a–c to fill in the boxes for each field 22a–e. The data entry form 30 object is comprised of various subcomponent view objects which function as data entry points in which the user enters data records. These view objects within the data entry form 30 object include text block objects 32, 34, a checkbox object 36, a field box object 38, and a radio button object 40. The text blocks 32, 34 objects are text fields in which the user enters the name of a book and the author's last name with input device 12a–c. The checkbox object 36 is a Boolean field in which the user enters or removes a graphical check. Checkbox 36 indicates whether the subject book is checked out. The fieldbox 38 when selected displays a drop down list. The user enters information into the data record by selecting a particular value from the drop down list with the input device 12a–c. The fieldbox 38 displays a drop down list which includes three selectable options for designating the floor in the library where the book is shelved. The radio button object 40 provides three radio buttons, wherein the user can only select one of such buttons to indicate whether the book record is in hardcover, paperback (softcover) or microfiche format.

Numerous other types of objects may also be added to a form object. For instance a graphic object supports OLE objects added to the database file. Some common OLE objects are graphics, charts, sound files, and data ranges. A graphic object may also include shapes, such as lines, ellipses, rectangles, round rectangles, etc. By associating a graphic object with the database file and form object, the user may include graphic objects in database records. A calculated field object stores the result of a formula. Another object which may be added to the database file is a custom control object, usually having the file extension .OCX, which is a special purpose application that accomplishes a specific task or range of tasks, such as drawing a graphic in the view, reporting stock prices, updating a calendar, etc.

Figure 4:
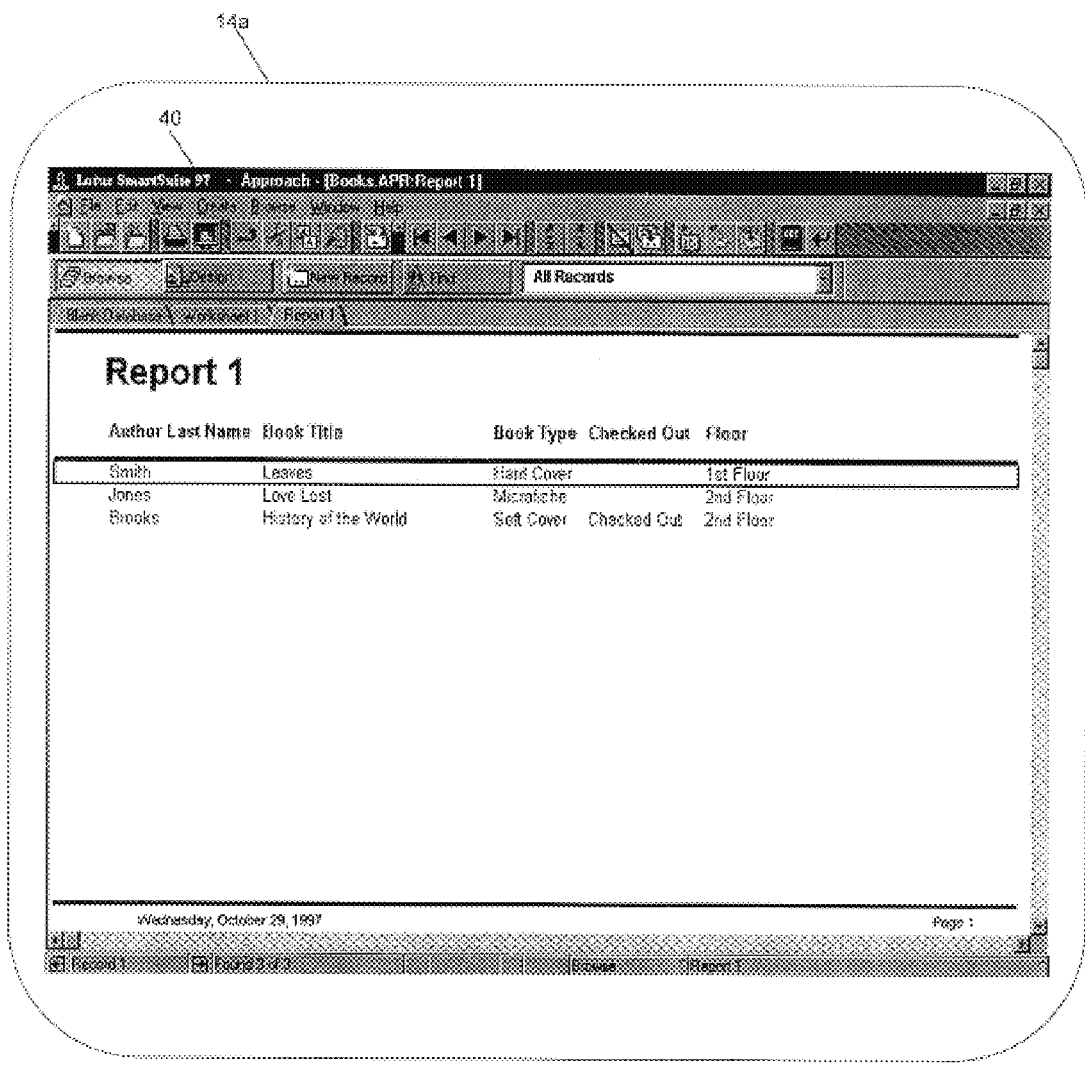
FIG. 4 is a "snapshot" of a window displaying a summary record included in the database file for displaying database records in a report format.

FIG. 4 illustrates a form object referred to as a summary report 40 displayed in the monitor 14a, which summarizes the database records in the database. These are just a sample of the different types of objects that can be associated with a database file to control the information maintained in a database and the display of such information in views such as summary reports and data entry forms. All the objects and the subcomponent objects associated with a database file may be stored in a single database file, e.g., "books.apr." However, those skilled in the art will appreciate that the objects associated with a single database and information on the objects may be stored in independent associated files as opposed to a single database file.

Thus, preferred embodiments of the present invention may be implemented as a method, apparatus or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary hardware and software environment described with respect to FIGS. 1–4 is not intended to limit the present invention. Indeed, those skilled in the art will recognize that other alternative hardware and software environments may be used without departing from the scope of the present invention.

Optimistic Multi-Authoring

As discussed, in preferred embodiments, a single database (.APR) file is defined by subcomponent objects, including subcomponent objects, such as form objects, view objects, and field objects which define the structure of the database. A subcomponent file, such as a form object, may be comprised of further subcomponent objects, such as view objects. In preferred embodiments, the main database (.APR) file includes information on each object and subcomponent object therein, including information on when each object was most recently revised. Thus, in a single database (.APR) file different objects may have different revision times. For instance, if the data entry form 30 was edited more recently than the summary report 40, then the data entry form 30 would have a later revision date. Moreover, the database file would maintain a single revision time for the database file as a whole, indicating when the database file was last edited. In this way, the database program 10 can determine when the database file was last modified and when particular subcomponent objects were last modified. The revision information can be contained within the database (.APR) file itself or within an associated file which includes information on the structure of the database (.APR) file, including information on the objects, subcomponent objects, and the revision dates thereof.

When a user at a client computer 4a, b, c first downloads a network version of a database file from the network drive 18, the database program 10 maintains an initial client version at the client computer 4a, b, c. This initial client version includes information on the network version of the file at the time of download. Such information in the initial client version would describe the objects and revision dates for the objects at the time of download. A user generates a current client version of the network version of the file by editing the downloaded file at the client computer 4a, b, c using the database program 10. In preferred embodiments, the network computer system 2 is configured to allow users at different client computers 4a, b, c to concurrently read and write to the network drive 18.

Figure 5:
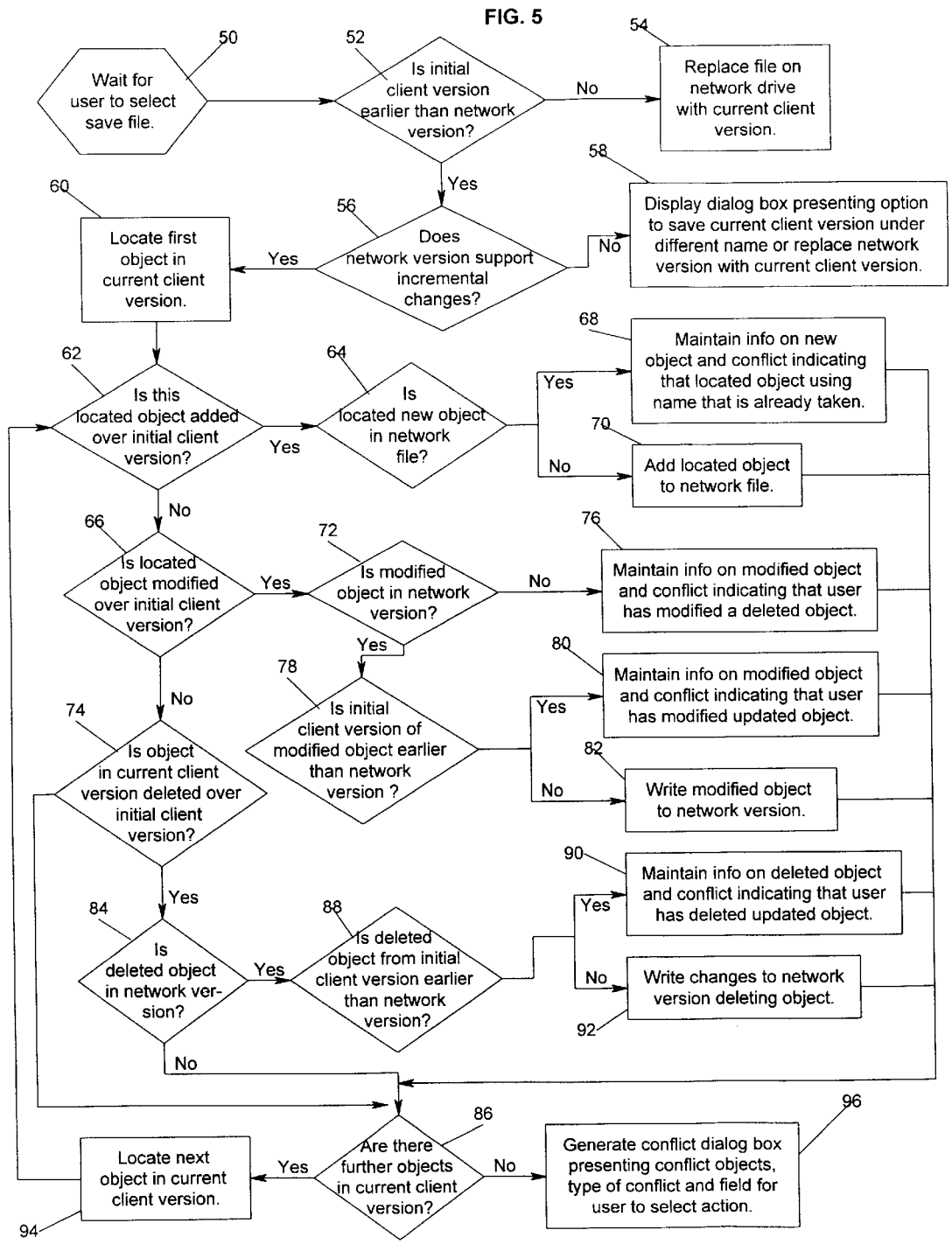
FIG. 5 is a flowchart that illustrates a preferred embodiment of logic for a routine to diagnose and resolve multi-authoring conflicts.

FIG. 5 is a flowchart illustrating preferred logic for utilizing the above compound file structure to resolve multi-authoring conflicts. Block 50 represents the database program 10 waiting for a user at a client computer 4a, b, c to try to save a current client version the user had been editing in the database program 10. Control transfers to block 52 which represents the database program 10 determining whether the initial client version has an earlier revision date than the network version. If the revision date of the initial client version is not earlier, then no one else has modified the network version since the user downloaded a copy of the network version. If the initial client version does not have an earlier revision date, then control transfers to block 54; otherwise control transfers to block 56. Block 54 represents the database program 10 saving the current client version on the network drive 18 to replace the network version of the file.

Block 56 represents the database program 10 determining whether the network version supports incremental changes. This determination is made because an object or portion of the network version may have been modified which effects the entire structure of the database file, thereby making it unfeasible for someone to make an incremental change to the network version of the file. For instance, if a user altered the field structure of the database of the network version and saved such alterations, then others making changes based on the previous database structure would be making changes to a database that no longer exists. If the network version of the file cannot be incrementally altered, then control transfers to block 58; otherwise control transfers to block 60. Block 58 represents the database program 10 displaying on the monitor 14a, b, c a dialog box presenting the user the option of saving the current client version under a different name to not effect the network version of the file or replacing the entire network version of the file with the current client version. If incremental changes can be made, block 60 represents the database program 10 locating the first object in the current client version. In preferred embodiments, the database program 10 considers each object in the current client version on an object-by-object basis. However, those skilled in the art will recognize alternative programming techniques to determine which objects in the current client version have been modified, such as using flags, comparing with the initial client version, etc.

From block 60, control transfers to block 62 which is a decision block representing the database program 10 determining whether the located object was added over the initial client version, i.e., the located object is not found in the initial client version. If the located object is new, then control transfers to block 64; otherwise control transfers to block 66. Block 64 is a decision block representing the database program 10 determining whether the new object is found in the network version of the file. If the new object is found in the network version of the file on the network drive 18, then another user saved a new object to the network version with the same name while the user was editing the current client version. This conflict is categorized as trying to use a name that has been taken. If the new object has a name that is already taken, then control transfers to block 68; otherwise control transfers to block 70. Block 68 represents the database program 10 maintaining information on the new object and the conflict type of trying to save a new object with a name of an object added to the network version while the user was editing the current client version. The database program 10 will later use this information to generate a conflict dialog box including information on all conflicts located. Block 70 represents the database program 10 incrementally adding the new object to the network version of the file without altering other aspects of the network version of the file. For instance, the user may add a form object, such as a summary report, to the network version.

Block 66 is a decision block representing the database program 10 determining whether the located object in the current client version is modified over the object in the initial client version, i.e., has the user modified an object. If so, control transfers to block 72; otherwise control transfers to block 74. Block 72 is a decision block representing the database program 10 determining whether the object which was modified in the current client version is present within the network version of the file. If no, control transfers to block 76; otherwise block 78. If the modified object is not present in the network version, then the user has modified an object that another user deleted from the network file while the user was editing the current client version. If the modified object was deleted by another, then, at block 76, the database program 10 maintains information on the modified object and the conflict indicating that the user has modified an object deleted from the network version of the file.

Block 78 represents the database program 10 determining whether the initial client version of the modified object has an earlier revision date than the network version of the object. If so control transfers to block 80; otherwise control transfers to block 82. If the initial client version has an earlier revision date, then the user is attempting to modify an object updated in the network version of the file by another while the user was working on the current client version. Block 80 represents the database program 10 maintaining information on the modified object and the conflict type indicating that the user is attempting to modify an updated object. Block 82 represents the database program 10 writing the modified object to the network version of the file as the object in the network version was not updated while the user was working on the current client version.

Block 74 represents the database program 10 determining whether the user has deleted an object in the current client version from the initial client version. If so, control transfers to block 84; otherwise control transfers to block 86. Block 84 represents the database program 10 determining whether the deleted object is in the network version of the file. If so control transfers to block 88; otherwise control transfers to block 86. Block 88 is a decision block representing the database program 10 determining whether the object deleted from the initial client version has an earlier revision date than the object in the network file, i.e., whether object in the network version of the file was modified before the user attempted to delete the object therefrom. If so control transfers to block 90; otherwise control transfers to block 92. Block 90 represents the database program 10 maintaining information on the deleted object and the conflict type of the user attempting to delete an object updated in the network version of the file. If the deleted object was not updated in the network version, then control transfers to block 92, which represents the database program 10 deleting the object from the network version. If, at block 88, the network version does not include the deleted object, then there is no need to attempt to delete the deleted object and, hence, control proceeds to block 86 to consider the next object in the current client version.

After the database program 10 has checked to determine whether there was a conflict or resolved such conflict at blocks 68, 70, 74, 76, 80, 82, 84, 90, and 92, then control transfers to block 86 which represents the database program 10 determining whether there are any objects in the current client version that have not been considered. If so, control transfers to block 94; otherwise control transfers to block 96. If there are additional objects, at block 94, the database program 10 locates the next object in the current client version and determines how to conflict check such object at blocks 62 et seq. If there are no more additional objects in the current client version to consider, then, at block 96, the database program 10 generates a conflict dialog box listing the objects in the current client version that conflict with the network version of the file, the basis for such conflict, and a user selectable field which allows the user to specify how to handle such conflict, i.e., overwriting the object in the network version of the file or saving the modified object in the network file under a different name.

Figure 6:
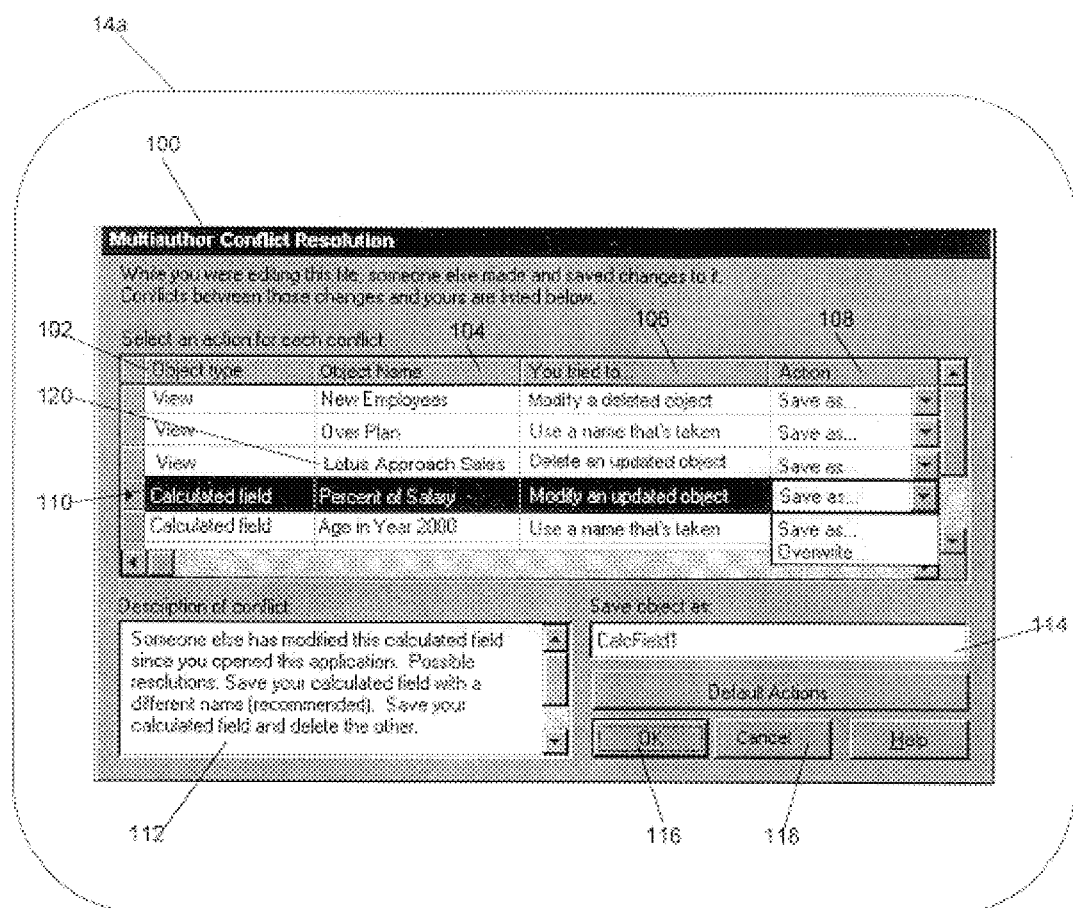
FIGS. 6–8 are "snapshots" of dialog boxes displayed that allow the user to selectively resolve multi-authoring conflicts.
Figure 7:
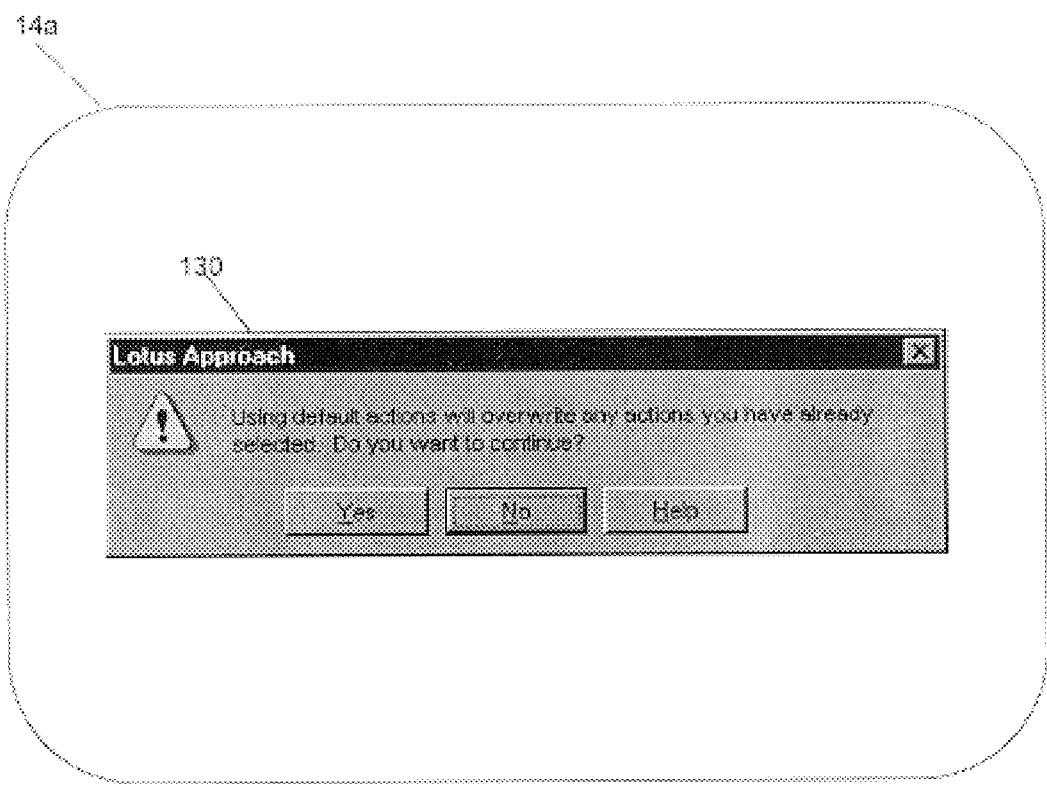
Figure 8:
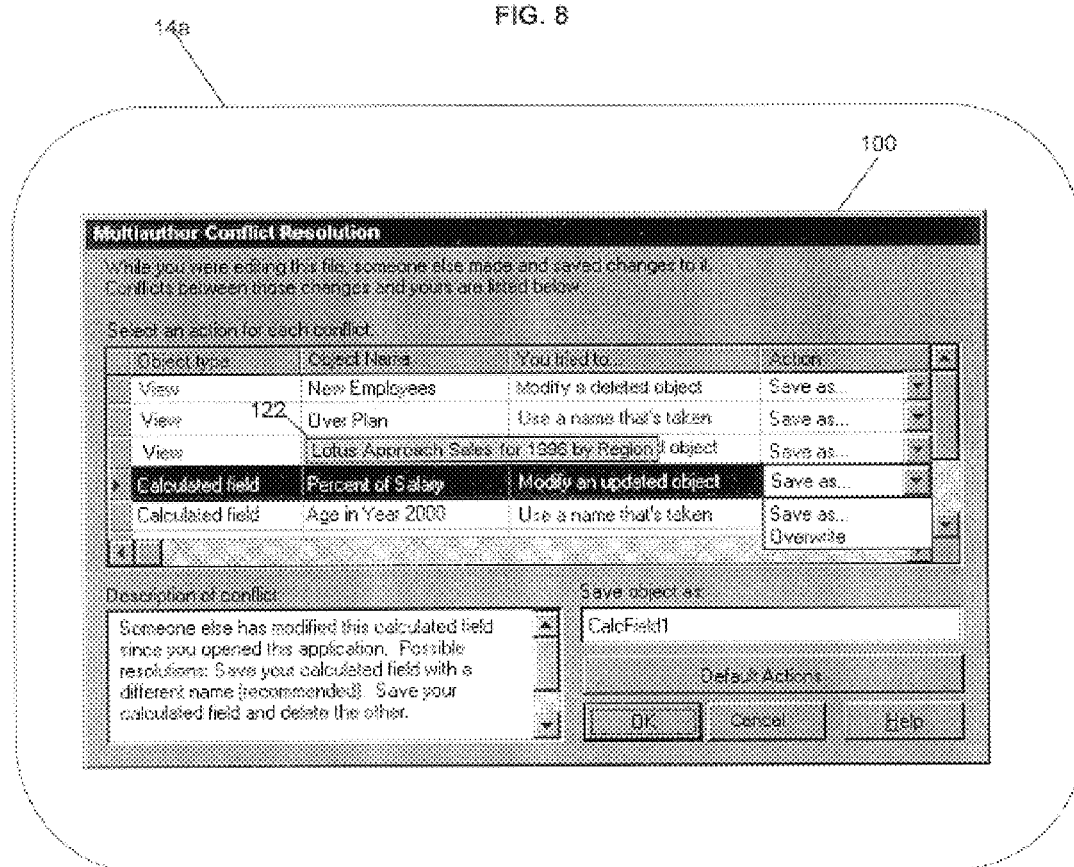

FIGS. 6, 7, and 8 are "snapshots" of dialog boxes displayed on the monitor 14*a, b, c* when the database program 10 performs conflict resolution activities. FIG. 5 illustrates a conflict resolution dialog box 100 displayed in the monitor 14*a* after the database program 10 examines the current client version for object conflicts. An object type column 102 displays the type of object in the current client version involved in the conflict. Column 104 displays the name of the conflicting object. Column 106 displays the nature of the conflict, i.e., tried to modify in the current client version an object deleted from the network version, used a name for a new object recently added in the network version, deleted an object recently updated to the network version or modified an object recently updated in the network version. An action column 108 displays a drop down list which provides two user selectable actions, "Save as" and "Overwrite." If the user selects "Save as," then the object edited in the current client version is saved under a different name in the network version. Otherwise, if the user selects the overwrite option, then the user will incrementally overwrite the object described in columns 102 and 104 in the network version of the file. Such incremental overwriting will not effect other parts of the network version of the file.

A description box 112 provides a detailed description of the nature of the conflict. A "save object as" field 114 shows how the conflicting object will be saved. In preferred embodiments, an OK button 116 is disabled until the user selects an action in the action column 108 for each of the listed conflicts. After an action has been selected for all conflicts, selection of the OK button 116 causes the action to occur. If the user selects a cancel button 118, the save option will disappear and the user will return to editing the current client version of the file. A default action button 120 allows the user to automatically set default actions for each conflict. If the user selects the default action button 120 and the user had previously entered actions in the action column 108, then a dialog box 130, shown in FIG. 7, is displayed informing the user that any action selected in the action column 108 will be overwritten by the default action settings.

FIG. 8 illustrates the dialog box 100 and a pop-up 122 that is displayed when the input device 12*a, b, c* passes over text in a cell which is too long to display in the cell. As seen in FIG. 6, cell 120 displays the object name "Lotus Approach Sales." When passing the input device 12a, b, c over this cell 120, the popup 122, shown in FIG. 8, displays the entire cell name over the cell, which in cell 122 is "Lotus Approach Sales for 1996 by Region."

In preferred embodiments, the conflict logic described in FIG. 5 is the first procedure called when the user attempts to save the current client version file being edited. Moreover, in preferred embodiments, when the user selects the OK button 116 in the conflict dialog box 100, the database program 10 performs another check of the network version to determine if the network version file was modified while the user was resolving conflicts in the conflict dialog box 100. If the network version was modified while the conflict dialog box 100 was displayed on the monitor 14a, b, c, then the database program 10 will perform another conflict test according to the logic of FIG. 5 to ascertain if any new conflicts have arisen as a result of the change to the network version.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program that edits files, such as a word processing program or a spreadsheet program, could benefit from the present invention. Although the preferred embodiments were described with respect to a file having an .APR extension, other file extensions could be used.

In summary, preferred embodiments of the present invention disclose a system for editing and saving a network file including a plurality of objects on a network drive. A first and second client computers are linked to the network drive over a network. A network file may be downloaded from the network drive to the first user client computer. The first client computer creates and edits a client version of the network file. The second client computer may download the network file from the network drive. To determine whether there is a conflict between modifications made by the second client computer to the network file and editing to an object by the first client computer, a determination is made as to whether the network file was modified by the second client computer while the first client computer was editing the client version. If so, then a determination is made as to whether there is a conflict between the editing by the first client computer to the object in the client version and the modification to the network file by the second client computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for editing and saving a network file maintained on a network drive, wherein the network file is comprised of a plurality of objects, and wherein a first and second client computers are linked to the network drive over a network, comprising the steps of:

downloading a network file from the network drive to the first client computer;

downloading the network file to the second client computer;

creating a client version of the network file on the first client computer;

editing an object in the client version on the first client computer;

determining whether the network file was modified by the second client computer while the first client computer was editing the client version; and determining whether there is a conflict between the modification to the network file by the second client computer and the editing to the object in the client version by the first client computer.

2. The method of claim 1, further comprising the step of displaying a dialog box providing information on the conflict between the editing of the object by the first client computer and the network file modified by the second client computer upon determining that there is a conflict.

3. The method of claim 2, wherein the displayed dialog box includes a field for indicating whether the first client computer performs one of saving the edited object in the client version to the network file and saving the edited object in the network file with a different name.

4. The method of claim 1, wherein the step of determining whether the second client computer modified the network file and whether there is a conflict occurs when the first client computer attempts to save the edited client version as the network file on the network drive.

5. The method of claim 1, wherein the step of determining whether there is a conflict further includes the step of determining whether the conflict is a member of the set of conflicts comprising:

the first client computer adding an object that has a name identical to a name of an object added to the network file by the second client computer while the first client computer was editing the client version;

the first client computer modifying an object that the second client computer modified in the network file while the first client computer was editing the client version;

the first client computer deleting an object that the second client computer modified in the network file while the first client computer was editing the client version; and the first client computer modifying an object that the second client computer deleted from the network file while the first client computer was editing the client version.

6. The method of claim 1, wherein the network file maintains information on a revision time for the network file modified by the second client computer and for each object within the modified network file, wherein the client version maintains a revision time for the network file and for each object in the network file at the time the first client computer downloaded the network file from the network drive, and wherein the step of determining whether the network file was modified by the second client computer while the first client computer was editing the client version comprises the step of determining whether the revision time for the network file maintained in the client version is earlier than the revision time for the network file maintained in the network file.

7. The method of claim 6, wherein the step of editing the object by the first client computer comprises modifying the object, and wherein the step of determining whether there is a conflict further comprises the steps of:

determining whether the modified object is in the network file modified by the second client computer;

determining whether the revision time for the modified object maintained in the client version is earlier than the revision time for the object maintained in the network file upon determining that the modified object is in the network file;

indicating that the first client computer has modified an object deleted from the network file by the second client computer upon determining that the modified object is not included in the network file; and indicating that the first client computer has modified an object that the second client computer previously modified in the network file upon determining the revision time for the object maintained in the client version is earlier than the revision time for the object maintained in the network file.

8. The method of claim 6, wherein the step of editing the object by the first client computer comprises deleting the object, and wherein the step of determining whether there is a conflict further comprises the steps of:

determining whether the revision time for the deleted object maintained in the client version is earlier than the revision time for the object maintained in the network file; and indicating that the first client computer has deleted an object that the second client computer previously modified in the network file upon determining that the revision time for the deleted object maintained in the client version is earlier than the revision time for the object maintained in the network file.

9. The method of claim 6, wherein the step of editing the object by the first client computer comprises adding an object to the client version, and wherein the step of determining whether there is a conflict further comprises the steps of:

determining whether the network file includes an object with the same name as the object added by the first client computer to the client version; and indicating that the first client computer has added an object having a same name as an object the second client computer previously added to the network file upon determining that the network file includes an object with the same name as the object added by the first client computer to the client version.

10. The method of claim 1, wherein the network file is comprised of at least two associated files and wherein the client version of the network file is comprised of at least two associated files.

11. A computer programming apparatus, comprising:

means, performed by a first client computer linked to a network drive over a network, for downloading a network file from the network drive, wherein the network file is comprised of a plurality of objects;

means, performed by a second client computer linked to the network drive over the network, for downloading the network file;

means, performed by the first client computer, for creating a client version of the network file;

means, performed by the first client computer, for editing an object in the client version of the network file;

means, performed by the first client computer, for determining whether the network file was modified by the second client computer while the first client computer was editing the client version; and means, performed by the first client computer, for determining whether there is a conflict between the modification to the network file by the second client computer and the editing to the object in the client version by the first client computer.

12. The apparatus of claim 11, further comprising, means, performed by the first computer, for displaying a dialog box providing information on the conflict between the editing of the object by the first client computer and the network file modified by the second client computer upon determining that there is a conflict.

13. The apparatus of claim 12, wherein the displayed dialog box includes a field for indicating whether the first client computer performs one of saving the edited object in the client version to the network file and saving the edited object in the network file with a different name.

14. The apparatus of claim 11, wherein the means for determining whether the second client computer modified the network file and whether there is a conflict occurs when the first client computer attempts to save the edited client version as the network file on the network drive.

15. The apparatus of claim 11, wherein the means for determining whether there is a conflict further includes means for determining whether the conflict is a member of the set of conflicts comprising:

the first client computer adding an object that has a name identical to a name of an object added to the network file by the second client computer while the first client computer was editing the client version;

the first client computer modifying an object that the second client computer modified in the network file while the first client computer was editing the client version;

the first client computer deleting an object that the second client computer modified in the network file while the first client computer was editing the client version; and the first client computer modifying an object that the second client computer deleted from the network file while the first client computer was editing the client version.

16. The apparatus of claim 11, wherein the network file maintains information on a revision time for the network file modified by the second client computer and for each object within the modified network file, wherein the client version maintains a revision time for the network file and for each object in the network file at the time the first client computer downloaded the network file from the network drive, and wherein the means for determining whether the network file was modified by the second client computer while the first client computer was editing the client version comprises means for determining whether the revision time for the network file maintained in the client version is earlier than the revision time for the network file maintained in the network file.

17. The apparatus of claim 16, wherein the means, performed by the first client computer, for determining whether there is a conflict further includes:

means for determining whether an object in the network file modified by the first client computer was modified by the second client computer;

means for determining whether the revision time for the modified object maintained in the client version is earlier than the revision time for the object maintained in the network file upon determining that the modified object is in the network file;

means for indicating that the first client computer has modified an object deleted from the network file by the second client computer upon determining that the modified object is not included in the network file; and means for indicating that the first client computer has modified an object that the second client computer previously modified in the network file upon determining that the revision time for the object maintained in the client version is earlier than the revision time for the object maintained in the network file.

18. The apparatus of claim 16, wherein the means for determining whether there is a conflict when the first client computer has deleted the object further includes:

means, performed by the first computer, for determining whether the first computer deleted an object from the client version;

means for determining whether the revision time for the deleted object maintained in the client version is earlier than the revision time for the object maintained in the network file upon determining that the object was deleted from the client version; and means for indicating that the first client computer has deleted an object that the second client computer previously modified in the network file upon determining that the revision time for the deleted object maintained in the client version is earlier than the revision time for the object maintained in the network file.

19. The apparatus of claim 16, wherein the means for determining whether there is a conflict further comprises:

means for determining whether an object was added to the client version by the first client computer;

means for determining whether the network file includes an object with the same name as the object added by the first client computer to the client version; and means for indicating that the first client computer has added an object having a same name as an object the second client computer previously added to the network file upon determining that the network file includes an object with the same name as the object added by the first client computer to the client version.

20. The apparatus of claim 11, wherein the network file is comprised of at least two associated files and wherein the client version of the network file is comprised of at least two associated files.

21. An article of manufacture for use in programming a client computer to edit and save a network file maintained on a network drive, wherein the network file is comprised of a plurality of objects, and wherein a first and second client computers are linked to the network drive over a network, the article of manufacture comprising a computer-readable storage medium having a computer program embodied therein that causes the first client computer to perform the steps of:

downloading a network file from the network drive;

creating a client version of the network file;

editing an object in the client version;

determining whether the network file on the network drive was modified by a second client computer while the first client computer was editing the client version; and determining whether there is a conflict between the modification to the network file by the second client computer and the editing to the object in the client version by the first client computer.

22. The article of manufacture of claim 21, further causing the first client computer to perform the step of displaying a dialog box providing information on the conflict between the editing of the object by the first client computer and the network file modified by the second client computer upon determining that there is a conflict.

23. The article of manufacture of claim 22, wherein the displayed dialog box includes a field for indicating whether the first client computer performs one of saving the edited object in the client version to the network file and saving the edited object in the network file with a different name.

24. The article of manufacture of claim 21, wherein the step of determining whether the second client computer modified the network file and whether there is a conflict occurs when the first client computer attempts to save the edited client version as the network file on the network drive.

25. The article of manufacture of claim 24, wherein the step of determining whether there is a conflict further includes the step of determining whether the conflict is a member of the set of conflicts comprising:

the first client computer adding an object that has a name identical to a name of an object added to the network file by the second client computer while the first client computer was editing the client version;

the first client computer modifying an object that the second client computer modified in the network file while the first client computer was editing the client version;

the first client computer deleting an object that the second client computer modified in the network file while the first client computer was editing the client version; and the first client computer modifying an object that the second client computer deleted from the network file while the first client computer was editing the client version.

26. The article of manufacture of claim 25, wherein the network file maintains information on a revision time for the network file modified by the second client computer and for each object within the modified network file, wherein the client version maintains a revision time for the network file and for each object in the network file at the time the first client computer downloaded the network file from the network drive, and wherein the step of determining whether the network file was modified by the second client computer while the first client computer was editing the client version comprises the step of determining whether the revision time for the network file maintained in the client version is earlier than the revision time for the network file maintained in the network file.

27. The article of manufacture of claim 26, wherein the step of editing the object by the first client computer comprises modifying the object, and wherein the step of determining whether there is a conflict further comprises the steps of:

determining whether the modified object is in the network file modified by the second client computer;

determining whether the revision time for the modified object maintained in the client version is earlier than the revision time for the object maintained in the network file upon determining that the modified object is in the network file;

indicating that the first client computer has modified an object deleted from the network file by the second client computer upon determining that the modified object is not included in the network file; and indicating that the first client computer has modified an object that the second client computer previously modified in the network file upon determining the revision time for the object maintained in the client version is earlier than the revision time for the object maintained in the network file.

28. The article of manufacture of claim 26, wherein the step of editing the object by the first client computer comprises deleting the object, and wherein the step of determining whether there is a conflict further comprises the steps of:

determining whether the revision time for the deleted object maintained in the client version is earlier than the revision time for the object maintained in the network file; and indicating that the first client computer has deleted an object that the second client computer previously modified in the network file upon determining that the revision time for the deleted object maintained in the client version is earlier than the revision time for the object maintained in the network file.

29. The article of manufacture of claim 26, wherein the step of editing the object by the first client computer comprises adding an object to the client version, and wherein the step of determining whether there is a conflict further comprises the steps of:

determining whether the network file includes an object with the same name as the object added by the first client computer to the client version; and indicating that the first client computer has added an object having a same name as an object the second client computer previously added to the network file upon determining that the network file includes an object with the same name as the object added by the first client computer to the client version.

30. The article of manufacture of claim 21, wherein the network file is comprised of at least two associated files and wherein the client version of the network file is comprised of at least two associated files.

31. A network computer system, comprising:

(a) a network drive;

(b) a first and second client computers linked to the network drive over a network, wherein the first and second client computers have read and write access to the network drive;

(c) a network file data structure stored on the network drive, comprising:
    (1) a plurality of objects;
    (2) a network file revision time indicating when the network file was last modified; and
    (3) an object revision time for each object in the network files indicating when the object was last modified;

(d) a memory in the first client computer storing a client version of the network file downloaded from the network drive, wherein the client version includes a data structure comprising:
    (1) the objects included in the network file at the time the first client computer downloaded the network file from the network drive, including any modifications thereto by the first client computer;
    (2) the network file revision time at the time the first client computer downloaded the network file, wherein the first client computer determines whether the network file on the network drive was modified after the first client computer downloaded the network file by comparing the revision time of the network file on the network drive with the network file revision time in the client version; and
    (3) the revision time of the objects in the network file at the time the first client computer downloaded the network file, wherein the first client computer determines whether an object in the network file on the network drive was modified after the first client computer downloaded the network file by comparing the revision time of a object in the network file on the network drive with the revision time for the object in the client version.

32. The network computer system of claim 31, wherein the objects are located in the network file and the revision times and information on the objects are located in a file associated with the network file.

* * * * *